United States Patent [19]

Borcuch et al.

[11] Patent Number: 5,537,828
[45] Date of Patent: Jul. 23, 1996

[54] CRYOGENIC PUMP SYSTEM

[75] Inventors: John P. Borcuch, Williamsville; Francis W. DeMarco, Niagara Falls; Norman H. White, East Amherst, all of N.Y.

[73] Assignee: Praxair Technology, Inc., Danbury, Conn.

[21] Appl. No.: 498,809

[22] Filed: Jul. 6, 1995

[51] Int. Cl.⁶ ........................................................... F17C 7/02
[52] U.S. Cl. ................................. 62/50.1; 62/50.2; 62/50.6
[58] Field of Search ........................................ 62/50.1, 50.2, 62/50.6

[56] References Cited

U.S. PATENT DOCUMENTS

| | | | |
|---|---|---|---|
| 4,554,791 | 11/1985 | Johansson | 62/50.1 |
| 4,570,578 | 2/1986 | Peschka et al. | 62/50.6 |
| 4,627,243 | 12/1986 | Schaub | 62/52 |
| 4,821,523 | 4/1989 | Borcuch et al. | 62/52 |
| 4,961,325 | 10/1990 | Halvorson et al. | 62/48.1 |
| 5,214,925 | 6/1993 | Hoy et al. | 62/50.1 |
| 5,218,827 | 6/1993 | Pevzner | 62/50.1 |
| 5,243,821 | 9/1993 | Schuck et al. | 62/50.6 |
| 5,381,667 | 1/1995 | Worley et al. | 62/50.2 |

*Primary Examiner*—Ronald C. Capossela
*Attorney, Agent, or Firm*—Stanley Ktorides

[57] ABSTRACT

A system for initiating the operation of a cryogenic pump wherein the suction line to the cryogenic pump and the cryogenic pump itself are brought to the proper cooldown temperature sequentially using separate temperature-based control schemes.

10 Claims, 1 Drawing Sheet

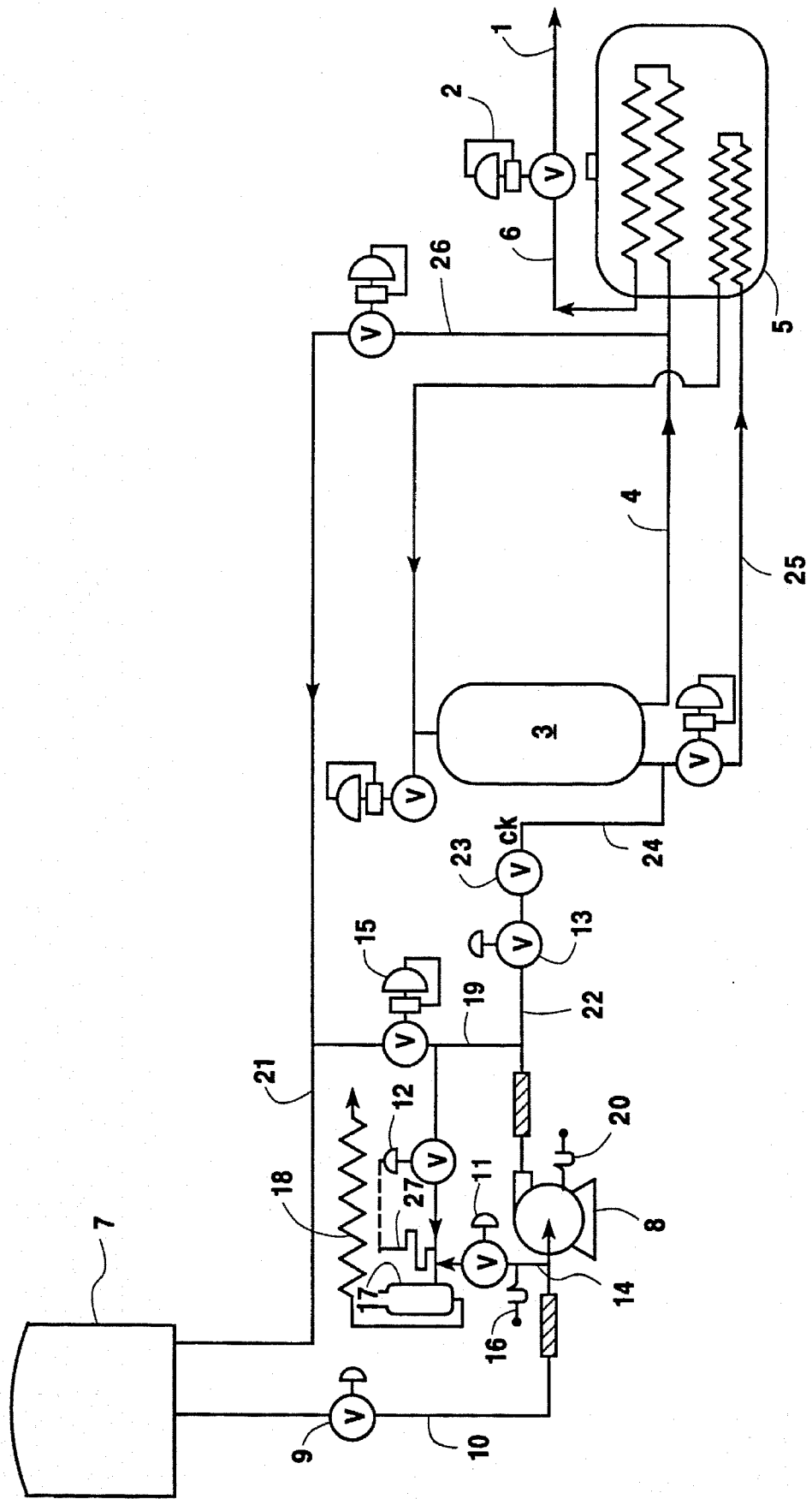

CRYOGENIC PUMP SYSTEM

TECHNICAL FIELD

This invention relates generally to cryogenic pumps and, more particularly, to the initiation of cryogenic pumping operation.

BACKGROUND ART

In many commercial situations, industrial gases, such as oxygen, nitrogen, argon and hydrogen, are supplied to a use point in a continuous manner, such as from a pipeline or from a production plant located at the site of the use point. In such continuous use situations, it is imperative, in the event the flow of the industrial gas to the use point is interrupted, that a back-up system provide gas to the use point until the primary gas supply system can be put back on line.

An industrial gas back up system typically comprises a high pressure storage tank, which holds a supply of cryogenic liquid, and a vaporizer which vaporizes the cryogenic liquid. The resulting industrial gas is then passed on to the use point. The high pressure storage tank contains a small amount of product. If the primary gas supply interruption is of extended duration, the high pressure tank requires replenishment. In such a case, cryogenic liquid is passed from a large low pressure cryogenic liquid reservoir to the high pressure storage tank using a cryogenic pump.

Before the cryogenic pump can pass cryogenic liquid from the large low pressure storage tank to the high pressure storage tank, it must be cooled down to the appropriate cryogenic temperature to ensure that the liquid does not vaporize before it reaches the pump. A cryogenic pump will not operate with vapor or even a mixture of liquid and vapor.

There are two methods used by the industrial gas industry to cool cryogenic pumps to the appropriate temperature to pump cryogenic liquid. The most widely used method is the time-based method wherein the pump is cooled for a fixed period of time prior to starting. This method is simple but can be wasteful because the proper cooling time will vary for each particular instance and thus the cooling period must be set conservatively to ensure complete cooldown under all circumstances. Moreover, this method is also disadvantageous because it increases the chances that the pump is allowed to cool too long. If the liquid in the pump is held too long, it can begin to vaporize via ambient heat leak, thus preventing pump operation. Another method is the vapor pressure method wherein a pressurized bulb of the cryogenic fluid is installed in the suction line to the pump to indicate when the proper fluid condition for pumping has been attained. This method has been unreliable because the pressurized bulb is prone to leakage over time and, moreover, this method has an inherent lag time in response because the corresponding output pressure signal requires the fluid within the bulb to condense against the outside temperature.

Accordingly it is an object of this invention to provide an improved cryogenic pump system which can undergo cooldown effectively thereby allowing reliable pump startup.

SUMMARY OF THE INVENTION

The above and other objects which will become apparent to those skilled in the art upon a reading of this disclosure are attained by the present invention, one aspect of which is:

A method for initiating operation of a cryogenic pump system, said cryogenic pump system comprising a low pressure liquid reservoir containing cryogenic liquid, a suction conduit passing from the low pressure liquid reservoir to a cryogenic pump, said suction conduit having a bypass line with a bypass valve thereon, a cooling line communicating with the cryogenic pump and having a cooling line valve thereon, a high pressure storage tank, and an output conduit passing from the cryogenic pump to the high pressure storage tank and having an output valve thereon, said method comprising:

(A) passing cryogenic liquid from the low pressure liquid reservoir through the suction conduit and the bypass valve, and monitoring the temperature of the suction conduit;

(B) when the temperature of the suction conduit is at a desired low temperature, closing the bypass valve, passing cryogenic liquid from the low pressure liquid reservoir through the suction conduit and the cryogenic pump, and monitoring the temperature of the cryogenic pump;

(C) when the temperature of the cryogenic pump is at a desired low temperature, opening the bypass valve, flooding the suction line, cryogenic pump and cooling line, and thereafter closing the bypass valve and the cooling line, valve and starting the cryogenic pump; and (D) pumping cryogenic liquid from the cryogenic pump through the output conduit and the output valve into the high pressure storage tank.

Another aspect of the invention is:

A cryogenic pump system comprising:

(A) a low pressure liquid reservoir, a cryogenic pump and a high pressure storage tank;

(B) a suction conduit communicating with the low pressure liquid reservoir and the cryogenic pump, said suction conduit having a bypass line with a bypass valve thereon for passing fluid out of the system, and means for monitoring the temperature of the suction conduit;

(C) a cooling line communicating with the cryogenic pump and having a cooling line valve thereon for passing fluid out of the system;

(D) means for monitoring the temperature of the cryogenic pump; and (E) an output conduit communicating with the cryogenic pump and the high pressure storage tank having an output valve system thereon.

As used herein the term "cryogenic liquid" means a fluid which at ambient pressure can exist in the liquid form at temperatures usually less than about 150° K.

As used herein the term "cryogenic pump" means a mechanical device that can increase the pressure of a cryogenic liquid and cause transport of the liquid via a conduit.

BRIEF DESCRIPTION OF THE DRAWING

The sole FIGURE is a simplified schematic representation of one preferred embodiment of the cryogenic pumping system of the invention.

DETAILED DESCRIPTION

The invention comprises a novel temperature based cryogenic pump cooldown system wherein the suction or input conduit to the cryogenic pump and the cryogenic pump itself are sequentially cooled prior to pumping. The sequential temperature-based cooling enables effective cooling of the pump down to the proper cryogenic temperature faster than conventional cooldown procedures regardless of local initial conditions and without excessive waste of cryogenic liquid.

The invention will be described in detail with reference to the Drawing which depicts a back-up industrial gas supply system for the practice of the invention. Referring now to the Figure, line 1 leads to a use point for industrial gas. For example, oxygen gas may be used by steelmaking, glassmaking, papermaking, etc. facilities, nitrogen gas may be used for heat treating, inerting, secondary oil and gas recovery and semiconductor manufacturing, argon gas may be used for steelmaking and blanketing operations, and hydrogen gas may be used for hydrogenation or combustion purposes. The industrial gas is supplied to the use point by a primary provision means such as a dedicated plant at the same site as the use point, or by a pipeline from a large centralized industrial gas production plant or plant complex. In the event the primary flow of industrial gas to the use point is interrupted, valve 2 is opened and pressurized cryogenic liquid flows from pressurized storage tank 3, through conduit 4 into vaporizer 5. The pressurized cryogenic liquid is vaporized in vaporizer 5 and resulting high pressure industrial gas passes out from vaporizer 5 through conduit 6 and valve 2 and then on to the use point through conduit 1. The flow continues until the primary industrial gas flow to the use point is restarted.

The cryogenic liquid is at an elevated pressure, generally within the range of from 50 to 500 pounds per square inch absolute (psia), while in storage tank 3. Accordingly high pressure storage tank 3 is not large since maintaining a large volume of pressurized cryogenic liquid on standby is expensive. Typically high pressure storage tank 3 is sized to provide about 30 minutes of industrial gas flow to the use point. If the primary industrial gas flow outage to the use point is other than of short duration, the pressurized cryogenic liquid within tank 3 must be replenished. The invention replenishes this pressurized cryogenic liquid quickly, effectively and efficiently.

The cryogenic pump system of the invention comprises low pressure liquid reservoir 7 and cryogenic pump 8. Low pressure liquid reservoir 7 contains cryogenic liquid such as, for example, liquid oxygen, liquid nitrogen, liquid argon or liquid hydrogen. The cryogenic liquid within tank 7 is at a low pressure, generally within the range of from 15 to 20 psia. Low pressure liquid reservoir 7 has a volume typically from 10 to 100 times the volume of high pressure storage tank 3.

While on standby, pump 8 is at ambient temperature and valve 9 on suction conduit 10 passing from reservoir 7 to pump 8 is closed. Also closed are bypass valve 11, cooling line valve 12, output valve 13 and recirculation valve 15. When the cryogenic liquid supply in tank 3 requires replenishment, valve 9 is opened and cryogenic liquid is passed from low pressure liquid reservoir 7 through suction conduit 10. The liquid flows due to the combination of liquid height in tank 7, usually 30 to 50 feet in height, and the tank ullage pressure, generally 15 to 20 psia.

Bypass valve 11 is on bypass line 14 of suction conduit 10 and is opened with the opening of valve 9. Cooling line valve 12 on cooling line 19 is also opened at this time. Cryogenic liquid passes from low pressure liquid reservoir 7 through suction conduit 10 and bypass valve 11 while the temperature of suction conduit 10 is monitored, proximate the cryogenic pump, by thermocouple 16. The cryogenic liquid is vaporized as it cools down suction conduit 10 and the resulting vapor and any excess liquid is passed out of the system through vent gas vessel 17 and vaporizer 18. Some vapor and perhaps some liquid passes through cryogenic pump 8 and out of the system through valve 12 but, because the flow resistance through the cryogenic pump is high if the fluid is vapor, most of the fluid passing from reservoir 7 in this initial phase passes through bypass line 14 rather than pump 8.

When the monitored temperature of the suction conduit is at a desired low set point temperature, typically within 30° K. of the cryogenic liquid boiling temperature, which indicates that the suction conduit has been brought to the cooldown temperature, bypass valve 11 is closed causing cryogenic liquid from reservoir 7 to flow directly from suction conduit 10 through pump 8 thus cooling cryogenic pump 8. Thereafter the fluid passes through cooling line 19 which is downstream of, and communicates with, pump 8. As before, resulting vapor with some liquid is passed out of the system through vent gas vessel 17 and vaporizer 18. Thermocouple 27 monitors the temperature of cooling line 19 and accordingly controls the degree of opening of valve 12 to provide efficient liquid utilization for cooling pump 8. Without the temperature controlled action of thermocouple 27 and valve 12, liquid could pass too quickly through the pump without vaporizing, resulting in inefficient operation.

As cryogenic liquid is passing through cryogenic pump 8, the temperature of pump 8 is monitored, such as by thermocouple 20. When the monitored temperature of the cryogenic pump is at a desired low set point temperature, typically within 40° to 50° K. of the liquid boiling temperature, i.e. the cooldown temperature, bypass valve 11 is reopened and valve 12 is disengaged from temperature modulation via thermocouple 27 and is fully opened. This serves to flood the suction conduit, the cryogenic pump and the cooling line, i.e. vapor is flushed out, filling the system with liquid for ideal pump starting conditions. Before the pump is started, valve 12 is closed and recirculation valve 15 is opened. The pump is started preferably with valve 11 still open for a short period, generally 2 to 10 seconds, and then bypass valve 11 is also closed. The pump discharge is recirculated to reservoir 7 via valve 15 and line 21. This provides pump stability prior to discharge to an elevated pressure. Following a period of recirculation to low pressure reservoir 7, typically within the range of from 30 second to 2 minutes, typically about 1 minute, the pump output is gradually transferred to high pressure storage tank 3. This is accomplished by opening output valve 13 and then slowly closing recirculation valve 15 thereby causing the output from cryogenic pump 8 to pass through output conduit 22 and then through output valve 13 and output check valve 23 to conduit 24 and into tank 3. The pressure in tank 3 is independently controlled by pressure building circuit 25. Discharge of the pump output directly to the high pressure storage tank avoids any need for pressure control of the pump output, such as by a pressure control valve on the output line. Further, the tank 3 volume provides a relatively constant pressure for the pump output. Once recirculation valve 15 is fully closed, all the output from pump 8 passes to tank 3 and this operation is continued until tank 3 is filled. In the event the primary gas supply to the use point is still not operational, cryogenic pump 8 continues to operate with excess flow being recirculated back to low pressure reservoir 7 through line 26. This avoids repeated starting and stopping of the cryogenic pump thereby saving power and cryogenic liquid.

By the use of the temperature-based control method of this invention one can initiate operation of a cryogenic pump system in a manner tailored to the specific pump cooldown time required for the particular existing conditions, and using the minimum amount of cryogenic liquid needed to achieve the requisite cooldown conditions. The sequential cooldown first of the suction conduit and then of the cryogenic pump reduces the total time required for system cooldown to cryogenic temperatures over that of conventional methods. By the use of bypass line 14 and bypass valve 11, most of the vapor generated by the cooldown of the suction conduit does not pass through the cryogenic pump. Because the cryogenic pump has a restrictive internal geometry, vapor flow though the pump is limited, thus increasing the total time required to achieve system cooldown. Valve 11 enables vapor bypass of the pump during the initial cooldown step enabling quick cooldown of the suction line followed by passage of liquid to the pump for quick pump cooldown.

Although the invention has been described in detail with reference to a certain embodiment, those skilled in the art will recognize that there are other embodiments of the invention within the spirit and the scope of the claims. For example, it will be recognized by those skilled in the art that in a commercial environment two cryogenic pumps can be used in parallel to ensure safe and successful operation in the event one of the pumps fails. Also, each of the temperature actuated valves would have a time default switch which actuates the valve after a set time period in the event the thermocouple activation system fails.

We claim:

1. A method for initiating operation of a cryogenic pump system, said cryogenic pump system comprising a low pressure liquid reservoir containing cryogenic liquid, a suction conduit passing from the low pressure liquid reservoir to a cryogenic pump, said suction conduit having a bypass line with a bypass valve thereon, a cooling line communicating with the cryogenic pump and having a cooling line valve thereon, a high pressure storage tank, and an output conduit passing from the cryogenic pump to the high pressure storage tank and having an output valve thereon, said method comprising:

(A) passing cryogenic liquid from the low pressure liquid reservoir through the suction conduit and the bypass valve, and monitoring the temperature of the suction conduit;

(B) when the temperature of the suction conduit is at a desired low temperature, closing the bypass valve, passing cryogenic liquid from the low pressure liquid reservoir through the suction conduit and the cryogenic pump, and monitoring the temperature of the cryogenic pump;

(C) when the temperature of the cryogenic pump is at a desired low temperature, opening the bypass valve, flooding the suction line, cryogenic pump and cooling line, and thereafter closing the bypass valve and the cooling line valve and starting the cryogenic pump; and (D) pumping cryogenic liquid from the cryogenic pump through the output conduit and the output valve into the high pressure storage tank.

2. The method of claim 1 wherein the cryogenic liquid is selected from the group consisting of liquid oxygen, liquid nitrogen, liquid argon and liquid hydrogen.

3. The method of claim 1 wherein the temperature of the suction conduit is monitored at the bypass line of the suction conduit.

4. The method of claim 1 wherein the desired low temperature of the suction conduit is within 30° K. of the boiling temperature of the cryogenic liquid.

5. The method of claim 1 wherein the desired low temperature of the cryogenic pump is within 40° K. of the boiling temperature of the cryogenic liquid.

6. The method of claim 1 further comprising passing some cryogenic liquid from the high pressure storage tank to the low pressure liquid reservoir.

7. The method of claim 1 further comprising pumping cryogenic liquid from the cryogenic pump into the high pressure storage tank without employing any pressure control means to control the output pressure of the cryogenic pump.

8. A cryogenic pump system comprising:

(A) a low pressure liquid reservoir, a cryogenic pump and a high pressure storage tank;

(B) a suction conduit communicating with the low pressure liquid reservoir and the cryogenic pump, said suction conduit having a bypass line with a bypass valve thereon for passing fluid out of the system, and means for monitoring the temperature of the suction conduit;

(C) a cooling line communicating with the cryogenic pump and having a cooling line valve thereon for passing fluid out of the system;

(D) means for monitoring the temperature of the cryogenic pump; and (E) an output conduit communicating with the cryogenic pump and the high pressure storage tank having an output valve system thereon.

9. The cryogenic pump system of claim 8 wherein the volume of the low pressure liquid reservoir is from 10 to 100 times the volume of the high pressure storage tank.

10. The cryogenic pump system of claim 8 further comprising means for passing fluid from the high pressure storage tank to the low pressure liquid reservoir.

* * * * *